Nov. 5, 1946.　　　A. L. RICHOLSON　　　2,410,525
MEASURING GAUGE FOR FUEL OIL TANKS
Filed Oct. 29, 1945

INVENTOR.
A. L. Richolson
BY
Kimmel & Crowell Attys.

Patented Nov. 5, 1946

2,410,525

UNITED STATES PATENT OFFICE 2,410,525

MEASURING GAUGE FOR FUEL OIL TANKS

Abraham L. Richolson, Brooklyn, N. Y.

Application October 29, 1945, Serial No. 625,376

3 Claims. (Cl. 73—332)

This invention relates to measuring gauges for gauging the quantity of liquids in a tank, and particularly the quantity of oil in an oil tank where the tank contains fuel oil.

At the present time in the filling of a fuel oil tank each tank is provided with a quantity gauge so that the owner will be able to determine the quantity of oil in the tank at all times, but the owner frequently fails to check the oil gauge before filling, and in this manner is unable to accurately determine the quantity of oil placed in the tank by the supplier. In addition the fuel gauge at present in use and available does not provide an accurate day to day measuring means whereby the user can accurately determine the quantity of fuel used from day to day, week to week or month to month.

It is, therefore, an object of this invention to provide a gauge which is connected to the fuel tank, and which is provided with a normally closed valve between the gauge and the tank at the lower end of the tank, and gauge, and with a second air valve at the top of the gauge connecting an air pipe between the top of the gauge and the top of the tank. The two valves are interconnected for simultaneous operation so that the valves will be opened at the same time.

In the event the tank is filled before a reading is taken by the user, the exact quantity of fuel placed in the tank can be calculated at a later time by opening the two valves connected to the gauge so as to provide for the rise of the oil in the gauge from its initial position, which determined the quantity of oil in the tank before filling, and when the valves are opened the liquid in the gauge will rise and the amount of oil placed in the tank can then be determined by a quantity scale at one side of the gauge.

Figure 1:
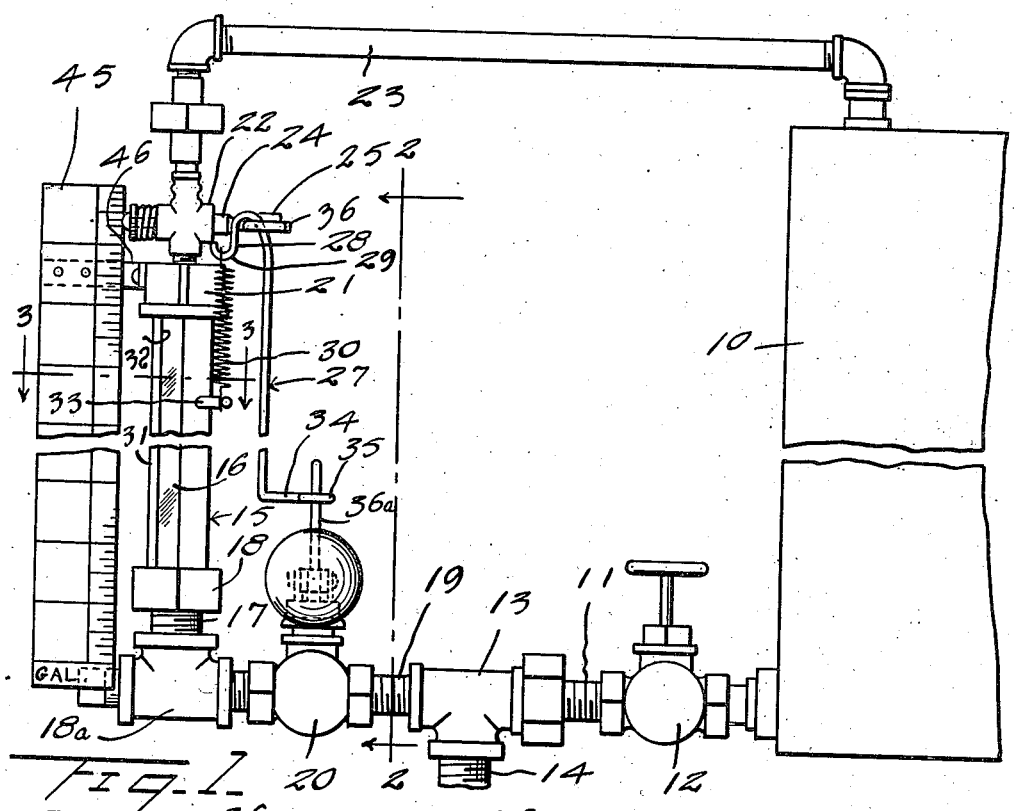
Figure 1 is a detail side elevation, partly broken away, of a gauge structure constructed according to an embodiment of this invention and connected to the outlet side of a fuel tank.
Figures 2, 3, 4:
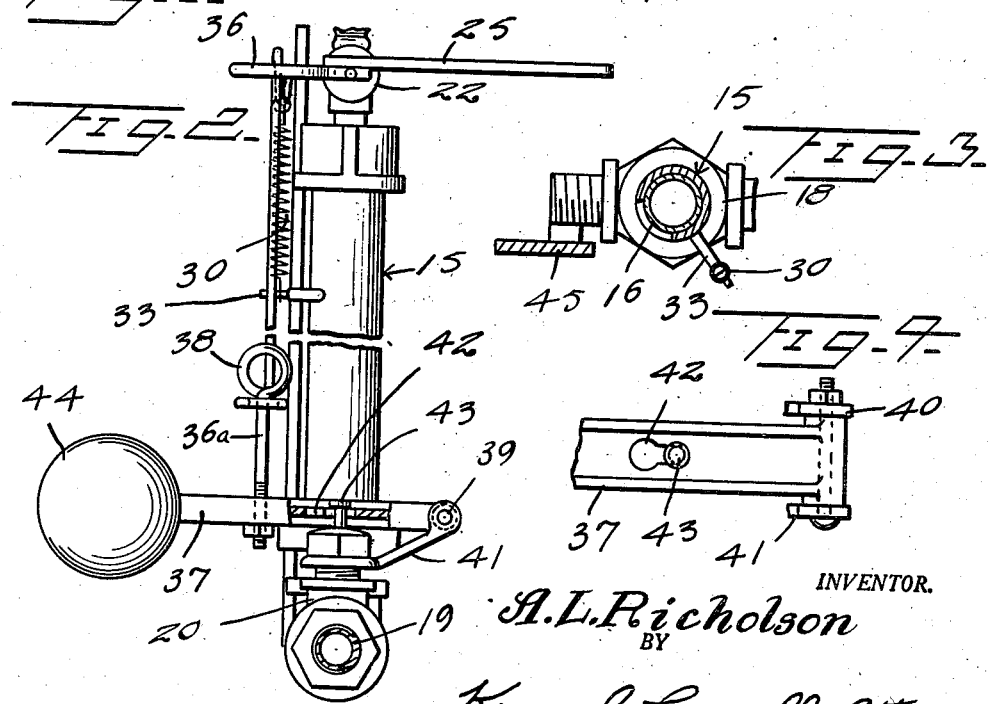
Figure 2 is a sectional view taken on the line 2—2 of Figure 1.
Figure 3 is a sectional view taken on the line 3—3 of Figure 1.
Figure 4 is a fragmentary plan view of the operator for the oil valve connected to the gauge.

Referring to the drawing the numeral 10 designates generally a tank which has connected thereto a pipe 11 in which a manually operated valve 12 is interposed. The pipe 11 has connected thereto one side of a T 13, and a second side of the T 13 has a fuel pipe 14 connected therewith. The pipe 14 is adapted to be connected to a conventional oil burner for supplying oil to the burner from the tank 10.

A gauge, generally designated as 15, is connected at its lower end to the T 13. The gauge 15 includes a transparent tube 16 which is connected to a nipple 17 by means of a gland 18. The nipple 17 is secured to one side of a second T 18a, and the T 18a has another side thereof connected to the T 13 by means of a pipe 19.

A valve 20 is interposed in the pipe 19, being of the spring-pressed type, which is normally urged to a closed position. The gauge structure 15 also includes a cap or gland member 21 secured to the upper end of the glass 16, and one side of an air valve 22 is secured to the cap 21.

An air pipe line 23 is connected at one end to the other side of the air valve 22, and the opposite end of the pipe 23 is connected to the top of the tank 10. The valve 22 is a conventional petcock, having a rotatable plug 24, to which an operating lever 25 is secured.

A second, oppositely extending arm 36, is secured to the plug 24, and is formed with an opening or eye through which the upper end of a valve operating link 27 is extended. The link 27 is formed with a reverted upper end, as indicated at 28, and the terminal end of the reverted end portion 28 is upturned so as to provide a hook 29 with which one end of a spring 30 is engaged.

A metal, longitudinally split cylindrical guard 31 is disposed about the glass tube 16, and is secured between the gland 18, and the cap 21. The guard 31 snugly engages about the glass tube 16 so as to protect this tube and prevent breakage thereof. The guard 31 is formed with a relatively wide side opening 32 so that the quantity of oil in the tube 16 can be readily seen.

The guard 31 has secured thereto a laterally extending lug 33 with which the lower end of the spring 30 is engaged. The link 27 is formed with a right angular lower end 34 which is formed with an eye 35 loosely engaging about a threaded bar 36a. The bar 36a is threaded through a rock lever or valve operating member 37, and the bar 36a, at its upper end, is formed with an eye 38 so as to limit the upward movement of the eye 35 and provide for raising the lever 37 to valve opening position when lever 25 is rocked downwardly so as to raise arm 36.

The lever 37 is rockably mounted on a pivot 39 engaging through a pair of ears 40 carried by a bracket arm 41. The arm 41 is mounted on the top of the valve 20 and the arm or lever 37 is formed with a buttonhole slot 42 through which the headed stem 43 of the valve 20 is adapted to engage.

The free end of the lever 37 is provided with a weight 44 so that the lever 37 will be gravitated and the valve stem 43 may be moved downwardly by the spring operating thereon, which is disposed within the valve housing.

An index plate or scale 45 is disposed at one side of the gauge structure 15, being supported in vertical position by means of a bracket 46 which is secured to the cap 21. The scale plate 45 is provided with graduations and indicia associated with the graduations to provide for accurate determination of the quantity of fuel oil in the tank 10, at any selected time.

In the use and operation of this gauge structure, assuming that the tank 10 is empty, the gauge glass 16 will also be empty of liquid. The supplier may fill the tank 10, and with the valve members 20 and 22 in their normally closed positions, the amount of liquid placed in the tank 10 will not register or appear in the gauge glass 16. After the tank has been filled the exact amount of fuel oil placed in the tank can be determined by rocking lever 25 downwardly so as to open the two valves 20 and 22. The fuel oil will then flow through the valve 20 upwardly into the gauge glass, the air in the gauge glass returning to the top of the tank.

The quantity of oil in the tank can now be determined by reading the graduation of the scale 45 at the level of the liquid in the gauge glass 16. Lever 25 may then be released and spring 30 will return valve 22 to its normally closed position, and weight 44 will lower operating lever 37 so that the stem 43 of valve 20 may be returned by its spring operator to closed position. The oil burner may then be operated in the usual manner, and the consumption of oil for a given period can be accurately determined by opening the valves 20 and 22 through rocking of lever 25.

As the quantity of oil in tank 10 is less than its first quantity which indicated a full tank, the level of oil in gauge glass 16 will also drop and the difference between the second level, and the first or filled level will determine the consumption for the particular period.

When the supplier again fills the tank, and assuming that the tank was not entirely empty, the user of this device will initially rock lever 25 to open the two valves 20 and 22 so that the oil in the gauge glass 16 will accurately indicate the quantity of oil in the tank 10 before refilling. The valves 20 and 22 are then closed by releasing the lever 25. Tank 10 is then filled or partially filled with oil and as valves 20 and 22 are closed the level of oil in gauge glass 16 will not rise to the level of the oil in tank 10. After the supplier completes discharging oil in tank 10, the user can accurately determine the amount of oil received by reading the gauge 16 on scale 45 before valves 20 and 22 are reopened. This valve may then be opened permitting the oil from tank 10 to pass into the gauge tube 16 whereupon a second reading will show the amount of fuel in the tank after the supplier has completed delivery. The difference between the two levels of the oil in the gauge glass 16 will accurately determine the amount of fuel supplied, which should check with the delivery receipt.

What I claim is:

1. In a device of the kind described a fluid supply tank having an upper laterally extending pipe, and a lower pipe extending laterally in the same direction as the upper pipe, a gauge tube extending upwardly between so as to be connected at opposite ends to said pipes, a valve in the upper end of said tube controlling the fluid flow from the upper pipe thereinto, a valve tapped into the lower pipe, a vernier extending coextensively with said tube on the side thereof, opposite to the last named valve, an operating hand lever connected to the valve for the upper pipe, projecting at right angles to the length of said vernier, a lever, means pivotally mounting one end of said lever to the lower pipe, and its intermediate end to the valve for the lower pipe, for opening and closing the latter valve, a spring having one end fixedly carried between the ends of said tube, on its side opposite to said vernier, and a link connected at its lower end to said lever, having a looped portion extending over, around and depending from said operating hand lever and terminating in a hook to which the other end of the spring is secured, whereby said looped portion may be held in engagement with said hand lever at all times.

2. In combination with a liquid tank having a gravity flow discharge pipe at its lower end, a level gauge attachment to said pipe comprising a transparent tube, means connecting the upper end of said tube to said tank, a connection between the lower end of said tube and said pipe, a pair of valves carried by the oppositely acting connections between said tank and said tube and between the tube and said pipe, dual spring and weight means for normally maintaining said valves closed, means connecting said valves together for simultaneous movement, and an operating lever carried by one of said valves wherein the valve on the connection between said tube and said pipe includes a lever seated on said valve to close it but supportedly connected to said valve, an upstanding bolt carried by said lever connected to one end of the means connecting the valves together and a spring urged link connecting the other end of the latter means to the other valve.

3. A level gauge attachment comprising a laterally extending inlet pipe, a transparent tube secured at its lower end thereto, caps at each end of said tube, a pair of valves, one connected to the upper end of said tube and the other one to said inlet pipe, a pivoted weighted lever carried by said inlet pipe, an upstanding bolt carried by said lever, a rod formed with an eye at one end loosely engaging said bolt and formed with a returned portion looping over and around and terminating in a hook, and a spring fixed at one end to said tube and at the other end to the hook end of said rod to thereby provide for simultaneous opening and closing of both of said valves, and a valve operating arm for opening the upper valve by a lifting action against the returned looped portion of said rod.

ABRAHAM L. RICHOLSON.